United States Patent [19]

Aubert et al.

[11] 4,081,322
[45] Mar. 28, 1978

[54] DEVICE FOR THERMAL INSULATION OF A PRESTRESSED CONCRETE VESSEL WHICH AFFORDS RESISTANCE TO THE PRESSURE OF A VAPORIZABLE FLUID CONTAINED IN SAID VESSEL

[75] Inventors: Gilles Aubert, Orsay; Guy Petit, Versailles, both of France

[73] Assignee: Commissariat a l'Energie Atomique, Paris, France

[21] Appl. No.: 695,424

[22] Filed: Jun. 14, 1976

[30] Foreign Application Priority Data

Jun. 19, 1975 France .................... 75 19264

[51] Int. Cl.² .................................. G21C 9/00
[52] U.S. Cl. ......................... 176/37; 176/52; 176/65; 176/87
[58] Field of Search ............ 176/87, 38, 51, 52, 176/53

[56] References Cited

U.S. PATENT DOCUMENTS

| | | | |
|---|---|---|---|
| 2,991,905 | 7/1961 | Monson et al. | 176/87 |
| 3,372,092 | 3/1968 | Margen | 176/52 |
| 3,488,067 | 1/1970 | Sommer | 176/87 |
| 3,497,421 | 2/1970 | Thome | 176/87 |
| 3,818,935 | 6/1974 | Karker et al. | 137/590 |
| 3,953,289 | 4/1976 | Costes | 176/87 |

FOREIGN PATENT DOCUMENTS

| | | | |
|---|---|---|---|
| 1,486,140 | 4/1967 | France | 176/87 |
| 1,128,572 | 4/1962 | Germany | 176/52 |
| 1,614,449 | 8/1970 | Germany | 176/87 |

Primary Examiner—Samuel W. Engle
Assistant Examiner—Ralph Palo
Attorney, Agent, or Firm—Lane, Aitken, Dunner & Ziems

[57] ABSTRACT

Two cylindrical shells having different diameters and covered with a metallic heat-insulation are disposed respectively within the lower and upper portions of a pressure vessel, the upper shell being closed by a lid. A chamber filled with fluid in liquid phase up to the liquid-vapor interface and with gas above said level is formed by the shells between the vaporizable fluid and the internal vessel wall, a cold liquid seal being formed by the overlapping portion of the shells. Radial expansion of the shells is permitted by supporting means at the level of at least three through-passages and is absorbed by leak-tight means placed opposite to the through-passages.

10 Claims, 7 Drawing Figures

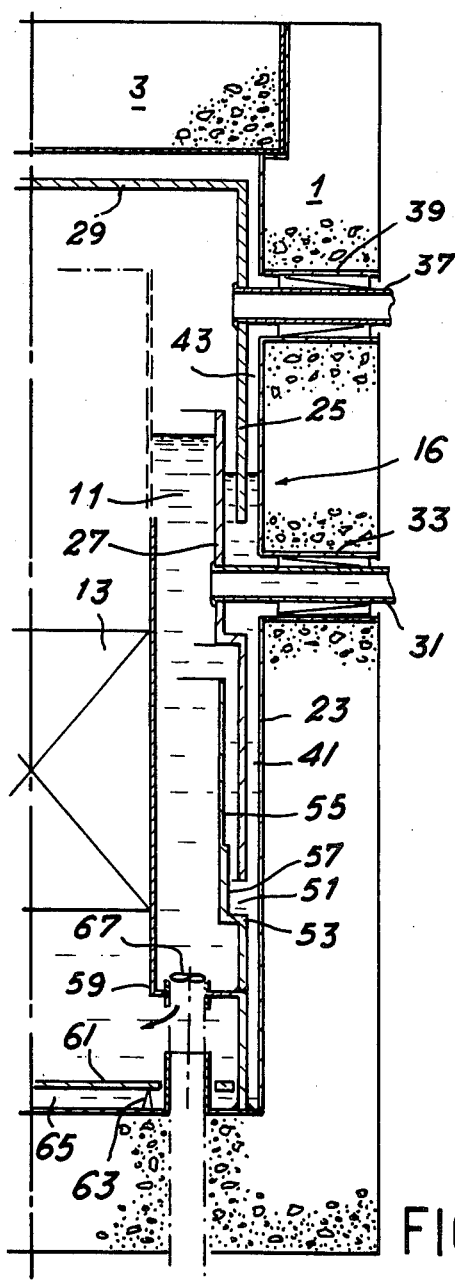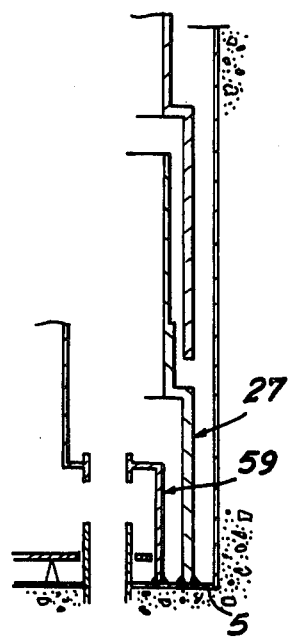

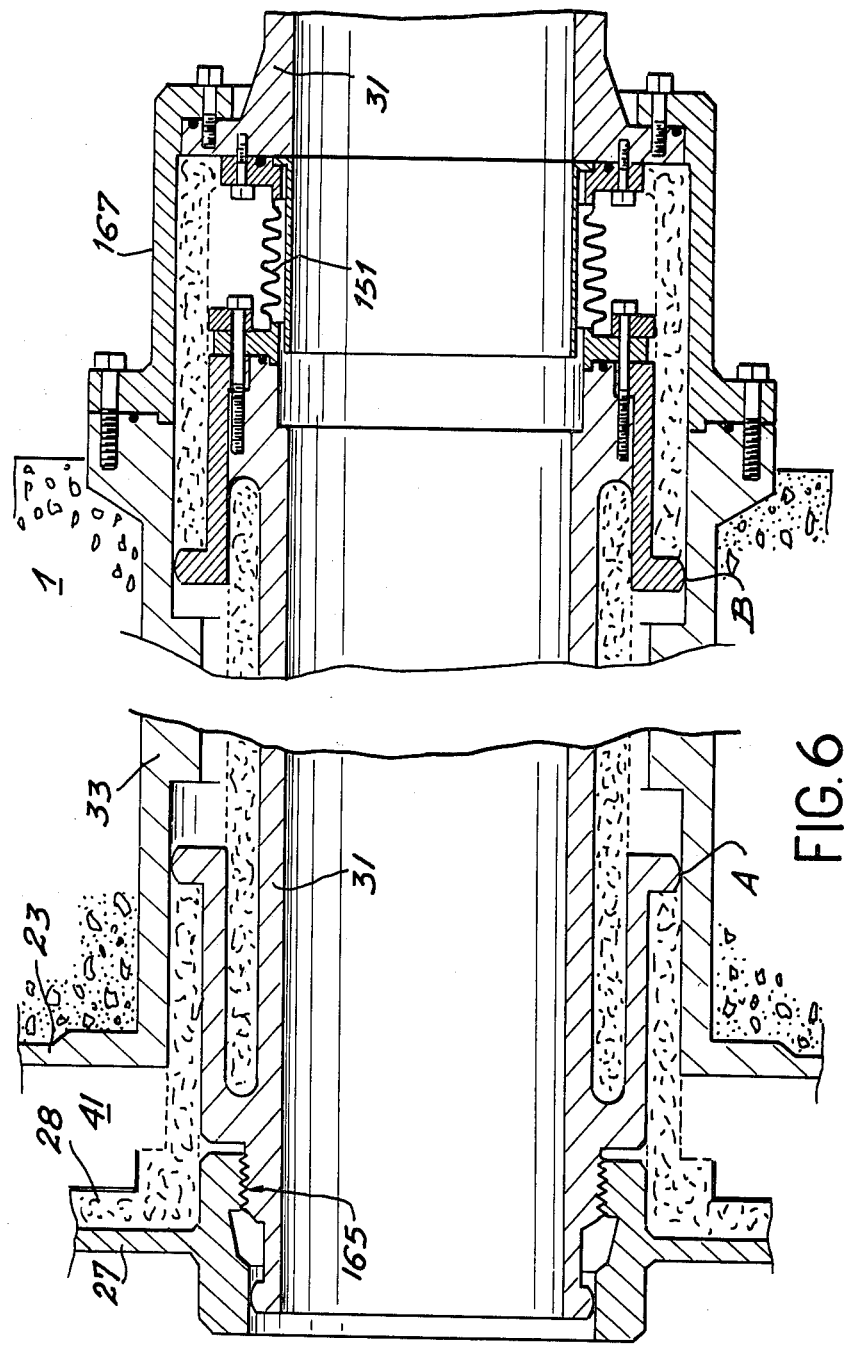

DEVICE FOR THERMAL INSULATION OF A PRESTRESSED CONCRETE VESSEL WHICH AFFORDS RESISTANCE TO THE PRESSURE OF A VAPORIZABLE FLUID CONTAINED IN SAID VESSEL

This invention relates to the thermal insulation of a prestressed concrete vessel which affords resistance to the pressure of a fluid contained within said vessel.

It is known that a pressure vessel of this type is employed in particular in a nuclear reactor which is cooled by a vaporizable liquid, said vessel being covered internally with a leak-tight metallic lining membrane.

In a nuclear reactor of this type, thermal insulation of the pressure vessel is carried out in known manner by placing within said vessel a casing which serves to trap the hot fluid under pressure so as to constitute a gas insulation between the internal wall of said vessel and said casing.

In order to gain a clear understanding of the problems which are solved by the present invention, reference will accordingly be made to the accompanying FIG. 1 which illustrates the prior art.

There is shown in this figure the prestressed concrete pressure vessel 1 closed by the shield slab or vault roof 3 of a nuclear reactor which is cooled by a vaporizable liquid, the main reactor components being placed within said vessel.

In particular, provision is made within said pressure vessel 1 for an internal metallic casing 5 having the shape of a bell which is attached to said vessel, which is associated with a liquid seal 9 and in which the coolant fluid 11 of the reactor core 13 is trapped. Thus said bell-casing 5 delimits with the internal wall of said pressure vessel 1 an annular space 15 which is filled with a heat-insulating gas under a suitable pressure.

It is readily apparent that ducts such as those designated by the references 17a and 17b open into said bell-casing 5 and that said ducts are designed and arranged within reactor vessel through-passages such as those designated by the references 19a and 19b in such a manner as to ensure that the expansions of said bell-casing 5 are absorbed.

Experience has shown that a heat-insulation system of this type suffers from a certain number of disadvantages.

It is found in practice that suitable means must be employed in order to balance the pressures existing respectively within the interior of said bell-casing 5 and of the annular space 15 during reactor operation.

Moreover, by reason of both the longitudinal and radial expansions of said bell-casing 5 at the level of a vessel through-passage 19, the arrangement of a duct 17 within a through-passage 19 proves both complex and unsatisfactory in regard to maintenance of leak-tightness of the annular space 15. It also proves necessary to place around the reactor core a safety jacket 21 in order to prevent loss of coolant from the reactor core in the event of gas leakage. Finally, there exists within the interior of the pressure vessel a large volume of compressed gas which entails the need to comply with certain essential requirements.

The present invention is precisely directed to a device which serves to insulate a prestressed concrete containment vessel of the type employed in a so-called boiling water reactor and which makes it possible to overcome the disadvantages attached to the device of the prior art which has been described in the foregoing.

The device in accordance with the invention permits the insulation of a prestressed concrete containment vessel which affords resistance to the pressure of a vaporizable fluid contained within said vessel in two phases separated by an interface, said pressure vessel being provided with a leak-tight metallic lining membrane and at least two families of coplanar pressure-vessel through-passages being arranged in the lower and upper portions of the pressure vessel so as to permit the positioning of ducts for the admission of said fluid in the liquid state and the discharge of said fluid in the gaseous state.

The device under consideration essentially comprises:

two shells disposed respectively within the lower and upper portions of said pressure vessel, the upper shell being closed by a lid, said shells which have different diameters being covered with a metallic heat-insulation and being intended to delimit between said vaporizable fluid and the internal wall of said pressure vessel a chamber filled with fluid in the liquid phase up to the level of the liquid-vapor interface of said fluid and filled with gas above said level, the arrangement of said shells in overlapping relation being such as to constitute a cold-fluid liquid seal;

means whereby said shells are each supported by said pressure vessel at the level of at least three of said vessel through-passages of a given family, said means being such as to permit of radial expansion of said shells at the level of said through-passages;

leak-tight means placed at the level of the vessel through-passages and capable of absorbing the radial expansion of said shells.

Thus the pressure vessel of a nuclear reactor which is cooled by a vaporizable fluid can be insulated in a simple and reliable manner by means of the device according to the invention, the characteristic features of which have been outlined in the foregoing. This result is achieved by virtue of the fact that leak-tightness of the chamber aforesaid remains satisfactory during reactor operation without thereby entailing the need for a complex arrangement of the ducts within the pressure vessel through-passages and that external regulation of the pressure which prevails within said chamber is applied to a smaller volume.

In fact, the chamber aforesaid is advantageously constituted by two separate shells having longitudinal expansions which are zero at the level of the pressure vessel through-passages and having an overlapping portion so arranged as to permit equalization of the pressures prevailing on each side of each shell aforesaid during reactor operation.

In a preferential alternative embodiment of the device according to this invention, said shell which is placed within the lower portion of the pressure vessel is provided between said fluid admission ducts and the bottom end-wall of said pressure vessel with an annular opening having a lower edge rigidly fixed to an annular component which extends upwards within said shell in parallel relation thereto, said shell being joined to the bottom end-wall of said pressure vessel in leak-tight manner and said component being covered with a metallic heat-insulation at least opposite to said annular opening.

Thus, in this preferential embodiment, the device in accordance with the invention has the advantage of ensuring that pressure equalization by the liquid seal does not produce an appreciable difference between the levels of the fluids located on each side of the lower shell since these fluids have very different temperatures. In this alternative embodiment, the pressures of the fluids aforesaid are in fact advantageously equalized at a point located distinctly above the bottom end-wall of the pressure vessel by virtue of said annular opening.

In the above-mentioned preferential alternative embodiment of the device in accordance with the invention, said annular opening is preferably formed in said lower shell as close as possible to said fluid admission ducts.

Moreover and in accordance with this alternative form, the bottom edge of said lower shell can be joined to the bottom end-wall of said pressure vessel either directly or by means of the internal structure which surrounds the reactor core.

In a particular arrangement of the invention, the lower and upper shells of the device under consideration, whether said shells are in accordance with the preferential alternative embodiment aforesaid or not, are respectively supported by said pressure vessel by means of the ducts for the admission of liquid and the ducts for the discharge of steam, said ducts being so arranged so as to be capable of sliding within the pressure vessel through-passages in order to permit of radial expansion of said shells at the level of said through-passages.

In another particular arrangement, said shells are each carried by supporting members rigidly fixed to said pressure vessel and located in the plane of the pressure vessel through-passages.

Furthermore and in accordance with the invention, bellows seal are interposed within said ducts for the admission of liquid or discharge of steam in order to absorb the radial expansions of each shell while maintaining a satisfactory degree of leak-tightness of the chamber aforesaid.

Said bellows seals can be placed either internally of the pressure vessel through-passages or externally of these latter, the advantage of the external arrangement being to permit easier and faster inspection and disassembly.

Further properties and advantages of the present invention will become more readily apparent from the following description of exemplified embodiments of the device in accordance with the invention for the thermal insulation of the pressure vessel of a so-called boiling water reactor, these embodiments being described by way of illustration but not in any sense by way of limitation.

The following description will be given with reference to the accompanying schematic drawings, wherein:

FIG. 3 is a vertical sectional view of a second alternative and preferential embodiment of the insulating device according to the invention in which the lower shell has an annular opening, said shell being joined to the bottom end-wall of the reactor vessel by means of the structure which surrounds the reactor core;

FIG. 3a is a vertical sectional view showing the lower portion of the device in accordance with the second alternative and preferential embodiment in which the lower shell is joined directly to the bottom end-wall of the pressure vessel;

Figure 5:
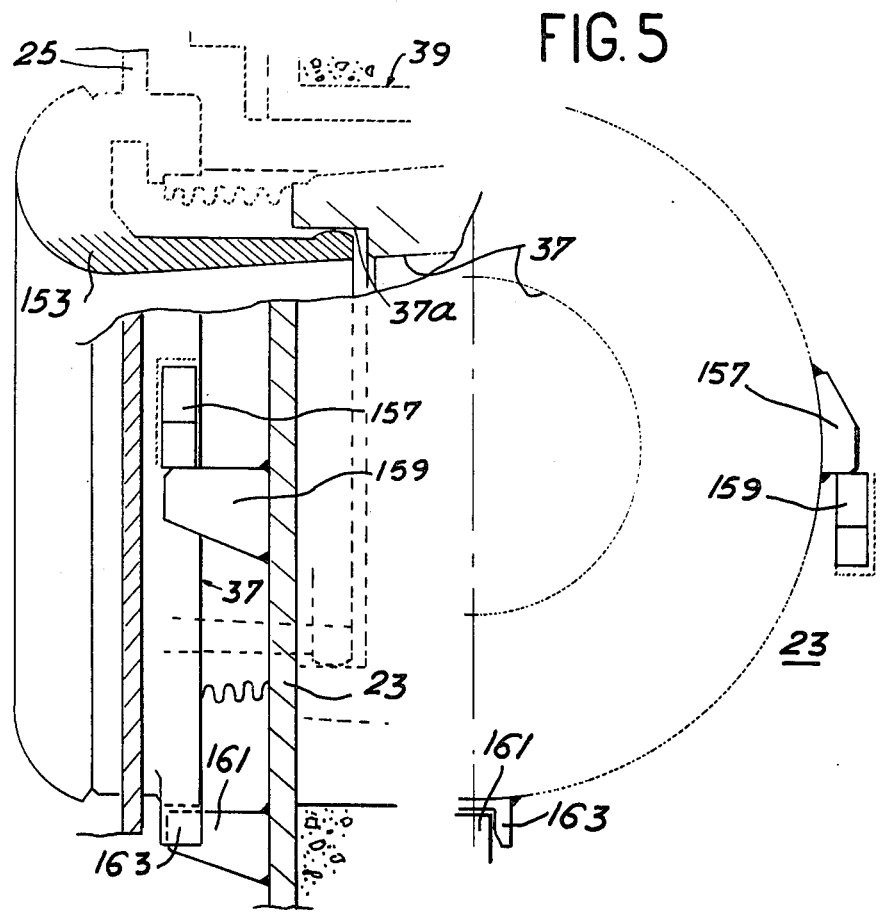

FIG. 5 is a part-sectional view of the device of the invention at the level of a pressure vessel through-passage in accordance with a second particular arrangement of the invention, the shell which is illustrated being carried by supporting members which are rigidly fixed to said pressure vessel at the level of the vessel through-passages in order to reduce vertical expansions to zero at the level of said through-passages;

FIG. 6 shows the device of the invention at the level of a pressure vessel through-passage in accordance with one embodiment which makes it possible in a simple manner to inspect the bellows seal and to disassemble the pressure vessel through-passage unit.

In FIG. 2, there can again be seen the concrete pressure vessel 1 of a nuclear reactor of the so-called boiling water type, said pressure vessel being closed at the top by the shield slab or vault roof 3 and covered on the internal face thereof with a leak-tight metallic lining membrane 23.

Within the interior of said pressure vessel 1, the coolant fluid 11 which serves to cool the reactor core 13 is trapped within a casing located internally of said vessel and constituted in accordance with the essential feature of the invention by two lightweight shells 25 and 27 arranged respectively within the upper and lower portions of said pressure vessel 1. The upper shell which is closed at the top by a lid 29 is located nearer to the internal wall of said pressure vessel 1 than the lower shell 27. The lid 29 is fixed on the upper shell 25 by means of conventional rapid-disassembly systems shown diagrammatically at 29'.

Figure 1:
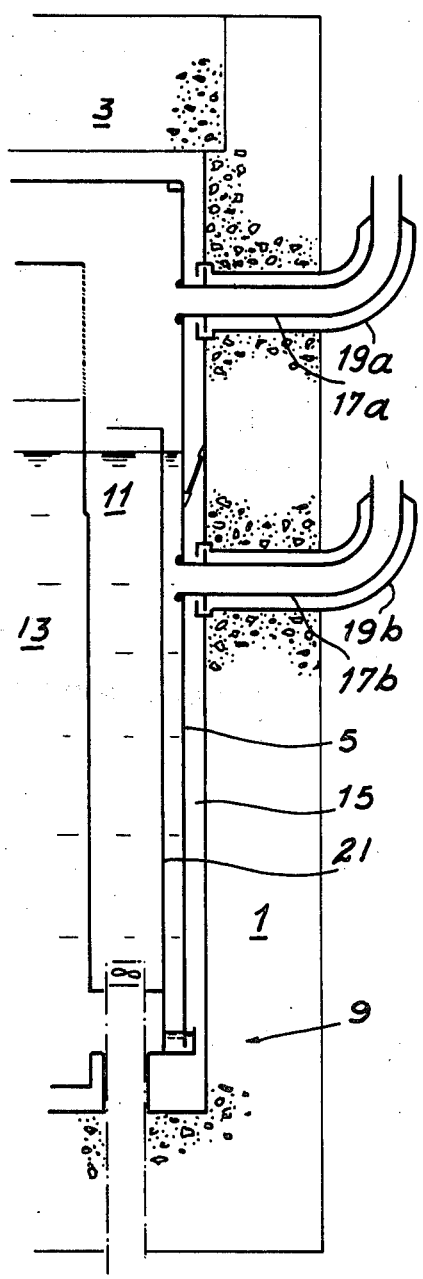
FIG. 1 is a vertical sectional view of the concrete pressure vessel of the prior art.
Figure 2:
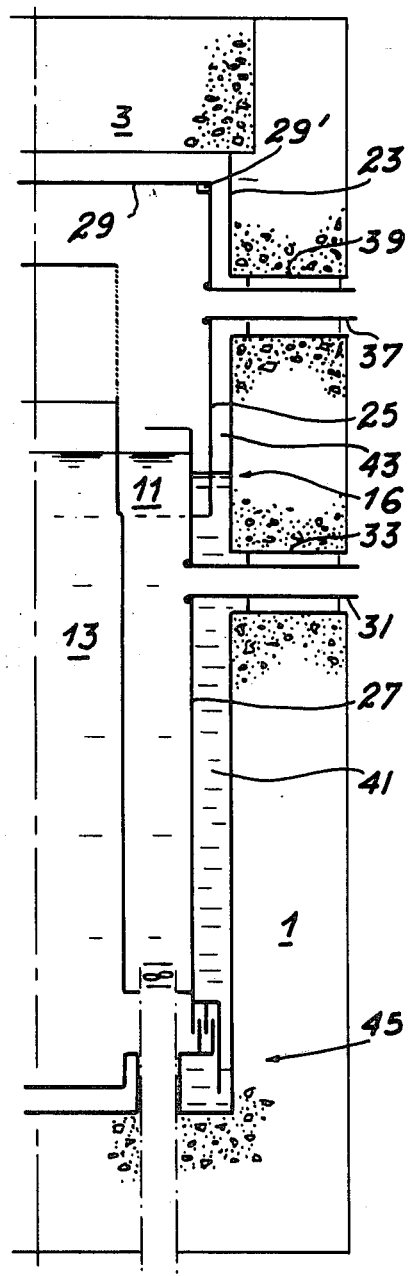
FIG. 2 is a vertical sectional view of a first alternative embodiment of the insulating device in accordance with the invention.

In the case of the nuclear reactor which is shown in FIG. 2, the coolant fluid 11 is fed into the lower shell 27 via ducts such as the duct 31 which are each arranged within through-passages such as the passage 33, coplanar through-passages similar to the passage 33 being provided at uniform intervals in the wall of said pressure vessel 1.

Said coolant fluid 11 which is heated within the reactor core 13 escapes in the form of vapor through ducts such as 37, said ducts being each arranged within a through-passage such as 39. Said through-passage 39 forms part of a second family of coplanar through-passages formed in the upper portion of said pressure vessel 1.

In accordance with a particular arrangement of the invention, the lower shell 27 is supported at the level of at least three of the through-passages such as 33 and the upper shell 25 is supported at the level of at least three of the through-passages such as 39.

The annular space 41 delimited by the lower shell 27 with the internal wall of the pressure vessel 1 is filled to a height corresponding approximately to the height of the coolant liquid contained within said lower shell 27 so as to constitute a cold-water insulation, said shell 27 being covered externally with a suitable metallic heat insulation such as Metalisol. It is pointed out that the equalization of said fluids by the cold-water liquid seal 16 during reactor operation.

In consequence, the through-passage 33 can advantageously be positioned at a sufficient distance above the reactor core 13.

Figure 4:
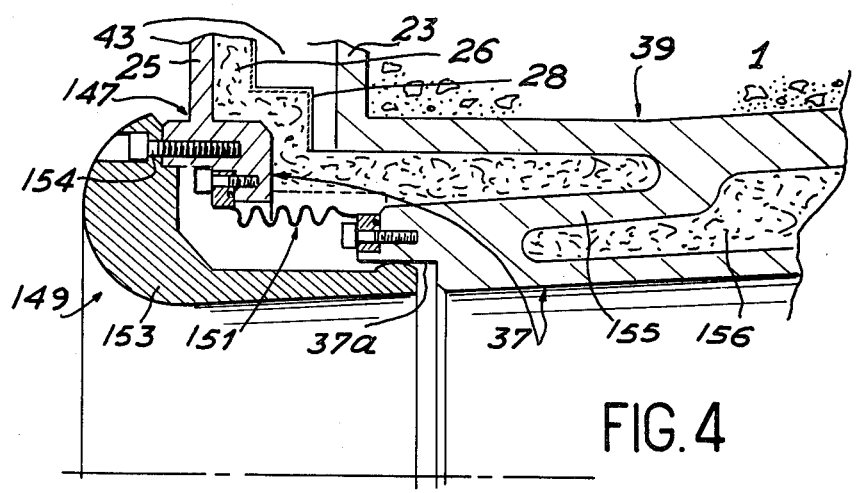
FIG. 4 is a vertical sectional view of the device at the level of a pressure vessel through-passage in accordance with a first particular arrangement of the invention, the shell which is illustrated being supported by the pressure vessel by means of the ducts which open into said vessel.

In FIGS. 4, 5 and 6, there is shown the device of the invention in accordance with either of the embodiments shown in FIGS. 2 and 3 at the level of the through-passages 33, 39; these figures present two modes of supporting of the shells 25, 27 by means of the pressure vessel 1 and the forms of construction of the ducts 31, 37 as well as the arrangement of these latter within said through-passages.

In FIG. 4, there can again be seen for example the upper shell 25 which delimits the annular space 43 with the internal wall of the pressure vessel 1, said shell being covered with a layer of heat-insulating material 26 which is adapted to the formation of a gas insulation such as Metalisol, for example, said heat-insulating material being protected by a thin sheet-steel member 28.

As shown in the figure, the edge 147 of said shell 25 which is delimited by the orifice 149 formed in this matter is rigidly fixed to the duct 37 in which is interposed a bellows seal 151. It is seen that said duct 37 is fitted internally with a removable jet pump 153 which is secured by means of the screw 154 to said duct 37 at the point of attachement of this latter to said shell 25, the free end of said jet pump 153 being capable of sliding within the interior of the duct 37 while being guided within the bore 37a which serves as a support for said jet pump 153.

The external wall of the duct 37 is joined to the internal wall of the pressure vessel 1 within the through-passage 39 by means of the frusto-conical skirt 155 in order to close the annular space 43 opposite to said through-passage 39, a heat-insulating packing 156 being interposed between said pressure vessel 1 and the duct 37 on each side of said skirt 155.

Thus, at the time of reactor operation, radial expansion of the shell 25 is permitted by virtue of the simultaneous displacement of the jet pump 153 within the duct 37 and absorbed by the bellows seal 151 which maintains leak-tightness of the space 43.

It is pointed out that longitudinal expansion of the shell 25 is zero at the level of the through-passage 39 since said shell 25 which is supported by the pressure vessel 1 at the level of said through-passage 39 by means of the jet pump 153 is free.

In the alternative embodiment of the device according to the invention as illustrated in FIG. 5, the elements shown are the same as those of FIG. 4 and will consequently be designated by the same reference numerals.

It is noticed that the shell 25 carries a member 157, for example at the point of attchement of said shell to the duct 37 as in FIG. 4. The member 157 is capable of bearing on a supporting member 159 which is rigidly fixed to the internal wall of the pressure vessel 1. The respective designs of said member 157 and of said support 159 are such that said shell 25 is capable of radial expansion during reactor operation.

As can readily be understood, the members such as 157 can be spaced at intervals along the periphery of the shell 25 at points which are separate from the points of attachement of said shell 25 to the ducts such as 27 since it is only necessary to ensure that said members are located in the plane of the through-passages such as the passage 39.

Moreover, in order to prevent angular displacement of the shell 25 within the interior of the pressure vessel 1, said vessel also carries a member 161 which is capable of engaging within a centering yoke 63, said yoke being rigidly fixed to the duct 37.

The only difference between the embodiments shown diagrammatically in FIGS. 4 and 5 therefore lies in the method adopted for supporting the shell 25 opposite to a through-passage. As can readily be understood, the description given with reference to FIGS. 4 and 5 also applies to the bottom portion of the device according to the invention at the level of the through-passages 33 opposite to which the lower shell 27 is supported.

FIG. 6 shows another alternative embodiment for the arrangement of means which are capable of permitting and absorbing expansion of a shell opposite to a through-passage.

The constructional design of the device at the level of either of the two families of through-passages 33 and 39 as will hereinafter be described in particularly desirable in the case of the lower through-passages which are nearest the reactor core in order to facilitate the inspection of the pressure vessel 1.

In fact, it is noticed that the duct 31 is secured simply by means of a threaded portion 165 which is screwed into the shell 27. This is possible without giving rise to any problems of leak-tightness since the liquid seal equalizes the pressures existing on each side of said shell and permits disengagement of said duct 31 from said shell 27 from the exterior of the pressure vessel 1.

As is readily apparent, the shell 27 is covered with heat-insulating material 28 such as Metalisol, for example, which is adapted to the provision of water insulation within the space 41.

As illustrated, the duct 31 is applied against the wall of the pressure vessel 1 at two points A and B located within the interior of the through-passage 33 so as to ensure that the shell 27 is supported by the pressure vessel 1 at the level of said through-passage 33. The duct 31 is capable of sliding within the through-passage 33 when said shell 27 undergoes radial expansion.

Thus the bellows seal 151 can advantageously be arranged externally of the pressure vessel 1 in order to facilitate inspection of the seal. The rapid-removal annular connecting-cover 167 which secures the duct 31 to the through-passage 33 closes the annular space 41.

In conclusion, it can be recalled that, when the device according to the invention is employed in a nuclear reactor, the reactor core need not longer be surrounded by a safety jacket by reason of the position of the pressure-equalizing siphon, thus making it possible to reduce the internal diameter of the reactor vessel.

We claim:

1. A device for thermal insulation of a prestressed concrete vessel which affords resistance to the pressure of a vaporzable fluid contained within said vessel in two phases separated by an interface, at least two families of coplanar through-passages being arranged in the lower and upper portions of the pressure vessel so as to permit positioning of ducts for the admission of said fluid in the liquid state and the discharge of said fluid in the gaseous state, wherein said device comprises:

two shells disposed respectively within the lower and upper portions of said pressure vessel, the upper shell being closed by a lid, said shells which have different diameters being covered with a metallic heat-insulation and being adapted to delimit between said vaporizable fluid and the internal wall annular space 41 is filled with insulating cold water at the time of filling of the reactor prior to start-up.

The space 43 delimited by the upper shell 25 with the internal wall of the pressure vessel is filled with gas so as to constitute a gas heat-insulation, said shell 25 being covered with suitable metallic heat-insulating material such as Metalisol. It should be made clear that the introduction of gas into the space 43 and regulation of the gas pressure are carried out by means of a loop which is external to the reactor and not illustrated.

In accordance with one of the characteristic features of the invention, said upper shell 25 penetrates into the water with which said annular space 41 is filled so as to constitute a cold-water liquid seal 16 in conjunction with the lower shell 27 which extends above the water level.

It can be noted that the lower shell 27 is provided at its base with a system of baffle-plates 45 for preventing any rapid transfer of fluid on each side of said shell 27 at the base of the pressure vessel 1.

The ducts 31 and 37 which open respectively into the shells 27 and 25 are shown very diagrammatically in FIG. 2. The detail design and arrangement of said ducts within a through-passage will be described with reference to FIGS. 4 to 6. These figures will serve to show the arrangement of the means according to the invention which permit the radial expansion of the shells at the point of support of each shell and the maintenance of leak-tightness of the annular spaces 41 and 43 aforesaid.

FIG. 2 simply shows in a diagrammatic manner the connection which must be established between the ducts and the through-passages in order to close the annular spaces 41 and 43 in leak-tight manner.

Before discussing in detail the mode of ction of the device as described in the foregoing, it is recalled that, during the course of reactor operation, the coolant fluid 11 vaporizes as it flows through the reactor core 13, thus resulting in a temperature rise as well as a pressure rise within the internal casing formed by said shells 25 and 27.

Thus the mode of action of the device according to the invention is such that, when the vapor pressure within the interior of said shell 25 rises, the pressure existing within said annular space also increases and this liquid seal constitutes a siphon.

It is worthy of note at this point that, by virtue of the liquid seal 16 which equalizes the pressures existing on each side of said shells 25 and 27 during reactor operation, leak-tightness at the level of the through-passages can be obtained in a simple manner as will be seen with reference to FIGS. 4 to 6.

FIG. 3 shows the device according to the invention in a preferential embodiment which makes it possible to avoid the establishment of a substantial different in level between the fluids which are present on each side of the lower shell during reactor operation. The elemtns which were already shown in FIG. 2 will be designated by the same reference numerals in FIG. 3.

Thus there can again be seen in this figure the casing which is located internally with respect to the pressure vessel and in which the coolant fluid 11 for the reactor core 13 is trapped. Said casing is constituted by two lightweight shells 25 and 27 which are arranged respectively within the upper and lower portions of said pressure vessel 1 and are supported by the vessel in the plane of the through-passages 33 and 39. The overlapping arrangement of said shells 25 and 27 constitutes a cold-water liquid seal 16, bearing in mind the fact that said annular spaces 41 and 43, are filled respectively with water and gas for the insulation of the pressure vessel.

The ducts 31 and 37 are also illustrated diagrammatically in FIG. 3. The design and arrangement of said ducts within the through-passages 33 and 37 will be described with reference to FIGS. 4 to 6.

It is apparent that, in accordance with the essential feature of the embodiment of the device shown in FIG. 3, the lower shell 27 is provided between the through-passages 33 and the bottom end-wall of the pressure vessel 1 with an annular opening 51, the bottom edge 53 of which is rigidly fixed to an annular component 55 which extends upwards inside said shell 27 and parallel to this latter.

Furthermore, it is observed in this figure that said annular component 55 is covered with a suitable metallic heat-insulation 57 placed externally and opposite to said annular opening 51. This heat-insulation is preferably identical with the material which overs the shells 25 and 27 and consists, for example, of Metalisol.

Moreover, it is noted from FIG. 3 that the bottom edge of the shell 27 is joined to the structure 59 in leak-tight manner. Said structure surrounds the reactor core 13 and is in turn joined to the bottom end-wall of the reactor vessel 1.

It is also observed that a metal plate 61 is maintained by means of supports shown diagrammatically at 63 above the bottom end-wall of the pressure vessel 1 so as to delimit with said vessel for the heat-insulation of this latter a compartment 65 within which the coolant fluid 7 is not circulated by the coolant circulation pumps 67.

In FIG. 3a, in which the references of FIG. 3 are again used, it is apparent that the lower shell 27 can be joined directly to the bottom end-wall of the pressure vessel 1 in leak-tight manner.

The mode of action of the device shown in FIGS. 3 and 3a is as follows: the respective pressures of the fluids which are present on each side of the shell 27 and have different densities by reason of the difference between their temperatures can be equalized, at a suitable height above the bottom of the pressure vessel 1 and preferably as close as possible to the through-passages 33, by means of the annular opening 51 formed in the lower shell 27.

Attention is also drawn to the fact that equalization of pressures by means of said annular opening 51 is achieved by preventing fluid transfers on each side of the shell 27 by means of the annular component 55 which is of sufficient height, joined to the bottom edge 53 of said opening 51 and placed within the interior of said shell 27.

In addition, by virtue of the non-heat-insulated extension of the annular component 55 above the annular opening 51, the volume of cold water which can be supplied through the reactor core in the event of an accident condition is accordingly limited.

Furthermore, by virtue of the heat-insulation 57 which covers the component 55 up to a suitable height, continuity of the thermal screen formed along the shells 25 and 27 is ensured opposite to the annular opening 51.

Thus the device in accordance with the alternative embodiment of FIGS. 3 and 3a makes it possible to limit to an appreciable extent and with complete safety the difference in level which is established between the fluids on each side of the shell 27 at the time of pressure of said pressure vessel a chamber filled with fluid in liquid phase up to the level of the liquid-vapor interface of said fluid and filled with gas above said level, the arrangement of said shells in overlapping relation being such as to constitute a cold-fluid liquid seal, the lower shell being separated from the inner surface of the pressure vessel;

means whereby said shells are each supported by said pressure vessel at the level of at least three of said vessel through-passages of a given family, said means being such as to permit of radial expansion of said shells at the level of said through-passages;

leak-tight means placed at the level of the through-passages and capable of absorbing the radial expansion of said shells.

2. A thermal insulation device according to claim 1, wherein the shell which is placed within the lower portion of the pressure vessel is provided between the fluid admission ducts and the bottom end-wall of said pressure vessel with an annular opening having a bottom edge rigidly fixed to an annular component which extends upwards within said shell in parallel relation thereto, said shell being joined to the bottom end-wall of said pressure vessel in leak-tight manner and said component being covered with a metallic heat-insulation at least opposite to said annular opening.

3. A device according to claim 2, wherein the annular opening is formed in the shell as near as possible to said fluid admission ducts.

4. A device according to claim 2, wherein the shell is joined directly to the bottom end-wall of the pressure vessel.

5. A device according to claim 2, wherein the shell is joined to the bottom end-wall of the pressure vessel by means of the internal structure which surrounds the reactor core.

6. A device according to claim 1, wherein the means whereby the shells are each supported by the pressure vessel are constituted in the case of the lower shell by the liquid admission ducts and in the case of the upper shell by the vapor discharge ducts, said ducts being capable of sliding within the vessel through-passages.

7. A device according to claim 1, wherein the means for supporting the shells are constituted by supporting members in rigidly fixed relation to the pressure vessel.

8. A device according to claim 1, wherein the leak-tight means which are capable of absorbing the radial expansion of the shells are constituted by bellows seals interposed within each of the fluid admission ducts and vapor discharge ducts.

9. A device according to claim 8, wherein said bellows seals are located inside the through-passages.

10. A device according to claim 8, wherein said bellows seals are located outside the through-passages.

* * * * *